US012073008B2

(12) United States Patent
Ofek et al.

(10) Patent No.: US 12,073,008 B2
(45) Date of Patent: Aug. 27, 2024

(54) THREE-DIMENSIONAL OBJECT TRACKING TO AUGMENT DISPLAY AREA

(71) Applicant: Microsoft Technology Licensing, LLC, Redmond, WA (US)

(72) Inventors: Eyal Ofek, Redmond, WA (US); Michel Pahud, Kirkland, WA (US); Pourang P. Irani, Winnipeg (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 17/519,244

(22) Filed: Nov. 4, 2021

(65) Prior Publication Data

US 2022/0129060 A1 Apr. 28, 2022

Related U.S. Application Data

(63) Continuation of application No. 14/987,511, filed on Jan. 4, 2016, now Pat. No. 11,188,143.

(51) Int. Cl.
*G06F 3/048* (2013.01)
*G06F 3/00* (2006.01)
(Continued)

(52) U.S. Cl.
CPC .............. *G06F 3/005* (2013.01); *G06F 3/017* (2013.01); *G06F 3/0304* (2013.01); *G06F 3/048* (2013.01);
(Continued)

(58) Field of Classification Search
None
See application file for complete search history.

(56) References Cited

U.S. PATENT DOCUMENTS 10,281,987 B1 * 5/2019 Yang ..................... G06F 3/0426
2004/0125994 A1 * 7/2004 Engels .............. G06V 40/1335
382/124

(Continued)

FOREIGN PATENT DOCUMENTS

EP 2648082 A2 * 10/2013 ........... G06F 1/1673
JP 2013232120 A * 11/2013

OTHER PUBLICATIONS

"Third Office Action Issued in Chinese Patent Application No. 201680073858.8", Mailed Date: Oct. 21, 2021, 4 Pages.

(Continued)

*Primary Examiner* — Justin S Lee
(74) *Attorney, Agent, or Firm* — Schwegman Lundberg & Woessner, P.A.

(57) ABSTRACT

In some examples, a surface, such as a desktop, in front or around a portable electronic device may be used as a relatively large surface for interacting with the portable electronic device, which typically has a small display screen. A user may write or draw on the surface using any object such as a finger, pen, or stylus. The surface may also be used to simulate a partial or full size keyboard. The use of a camera to sense the three-dimensional (3D) location or motion of the object may enable use of above-the-surface gestures, entry of directionality, and capture of real objects into a document being processed or stored by the electronic device. One or more objects may be used to manipulate elements displayed by the portable electronic device.

20 Claims, 10 Drawing Sheets

(51) Int. Cl.
*G06F 3/01* (2006.01)
*G06F 3/03* (2006.01)
*G06F 3/0487* (2013.01)
*G06F 3/04883* (2022.01)

(52) U.S. Cl.
CPC ........ *G06F 3/0487* (2013.01); *G06F 3/04883* (2013.01)

(56) References Cited

U.S. PATENT DOCUMENTS

2008/0244447 A1* 10/2008 Sagar .................. G06F 3/04817 715/810
2009/0172606 A1* 7/2009 Dunn ...................... G06F 3/017 715/863
2011/0164029 A1* 7/2011 King ....................... G06T 19/00 345/173
2012/0268369 A1* 10/2012 Kikkeri ..................... G06F 3/02 345/157
2012/0276995 A1* 11/2012 Lansdale ............... A63F 13/213 463/31
2013/0066526 A1* 3/2013 Mondragon ........... G06V 40/20 701/49
2013/0135199 A1* 5/2013 Perski ................... G06F 3/0425 345/156
2013/0241832 A1* 9/2013 Rimon ................ G06F 3/03545 345/158
2013/0278499 A1* 10/2013 Anderson ............. G06F 3/0304 345/156
2013/0293490 A1* 11/2013 Ward .................... G06F 3/0488 345/173
2013/0296057 A1* 11/2013 Gagner ............... A63F 13/2145 715/863
2013/0321356 A1* 12/2013 Al-Sharif ............ G06F 3/03542 345/179
2014/0198024 A1* 7/2014 Adzhigirey ......... G06F 3/04815 345/156
2014/0282274 A1* 9/2014 Everitt .................. G06F 3/0485 715/863
2014/0282278 A1* 9/2014 Anderson ............... G06F 3/017 715/863
2014/0300531 A1* 10/2014 Hong .................... G06F 3/0304 345/156
2015/0052476 A1* 2/2015 Nakao ................ G06F 3/04845 715/794
2015/0084866 A1* 3/2015 Thomas .................. G06F 3/017 345/158
2015/0123994 A1* 5/2015 Suzuki .................... G06F 3/011 345/629
2015/0131913 A1* 5/2015 Anderson ............... G06F 3/042 382/203
2015/0234528 A1* 8/2015 Choi ................... G06F 3/04883 345/173
2016/0062469 A1* 3/2016 Abi-Rached ............ G06F 3/017 345/156

OTHER PUBLICATIONS

Butler, et al., “SideSight: Multi-“touch” Interaction Around Small Devices”, In Proceedings of the ACM Symposium on User Interface Software and Technology, Oct. 2008, 4 Pages.
Kim, et al., “RetroDepth: 3D Silhouette Sensing for High Precision Input on and Above Physical Surfaces”, In Proceedings of ACM CHI Conference on Human Factors in Computing Systems 2014, Apr. 26, 2014, pp. 1377-1386.
Smith, Chris, “Meet Fuffr, the Case that Extends your iphone 5s Touchscreen to your Desk”, Retrieved from https://bgr.com/general/fuffr-iphone-5s-motion-control-case/, Jun. 3, 2014, 7 Pages.
“Notice of Allowance Issued in Chinese Patent Application No. 201680073858.8”, Mailed Date: Apr. 7, 2022, 4 Pages.
U.S. Appl. No. 14/987,511 U.S. Pat. No. 11,188,143, filed Jan. 4, 2016, Three-Dimensional Object Tracking to Augment Display Area.

* cited by examiner

THREE-DIMENSIONAL OBJECT TRACKING TO AUGMENT DISPLAY AREA

CLAIM OF PRIORITY

This application is a continuation of U.S. patent application Ser. No. 14/987,511, filed on Jan. 4, 2016, the benefit of priority of which is claimed hereby, and which is incorporated by reference herein in its entirety.

BACKGROUND

The popularity of smartphones, tablets, and many types of information appliances is driving demand and acceptance of touchscreens and other displays for portable and functional electronics. Touchscreens and other displays are found, among other places, in the medical field and in heavy industry, as well as in automated teller machines (ATMs), and kiosks such as museum displays or room automation, where keyboard and mouse systems do not allow a suitably intuitive, rapid, or accurate interaction by the user with the display's content.

Generally, portable electronic devices have relatively small touchscreens, leading to challenges in content creation and modification, such as in word processing, drawing, drafting, and so on. Display elements displayed on a touchscreen manipulated by a user's finger, which may be relatively large compared to the display elements, for example, may be at least partially occluded by the finger. Also, such manipulation by touch may be of a relatively low resolution due, at least in part, to the smallness of the touchscreen.

SUMMARY

This application describes user interaction with elements displayed by a display device, which may be relatively small and portable. A surface, such as a desktop, in front or around a portable electronic device (e.g., phone) may be used as a relatively large surface for interacting with the portable electronic device, which typically has a small display screen. A user may write or draw on the surface using any object such as a finger, pen, or stylus. The surface may also be used to simulate a partial or full size keyboard. The use of a camera to sense the three-dimensional (3D) location or motion of the object may enable use of above-the-surface (e.g., hover) gestures, entry of directionality, and capture (scan) of real objects into a document being processed or stored by the electronic device. One or more objects may be used to manipulate elements displayed by the portable electronic device.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
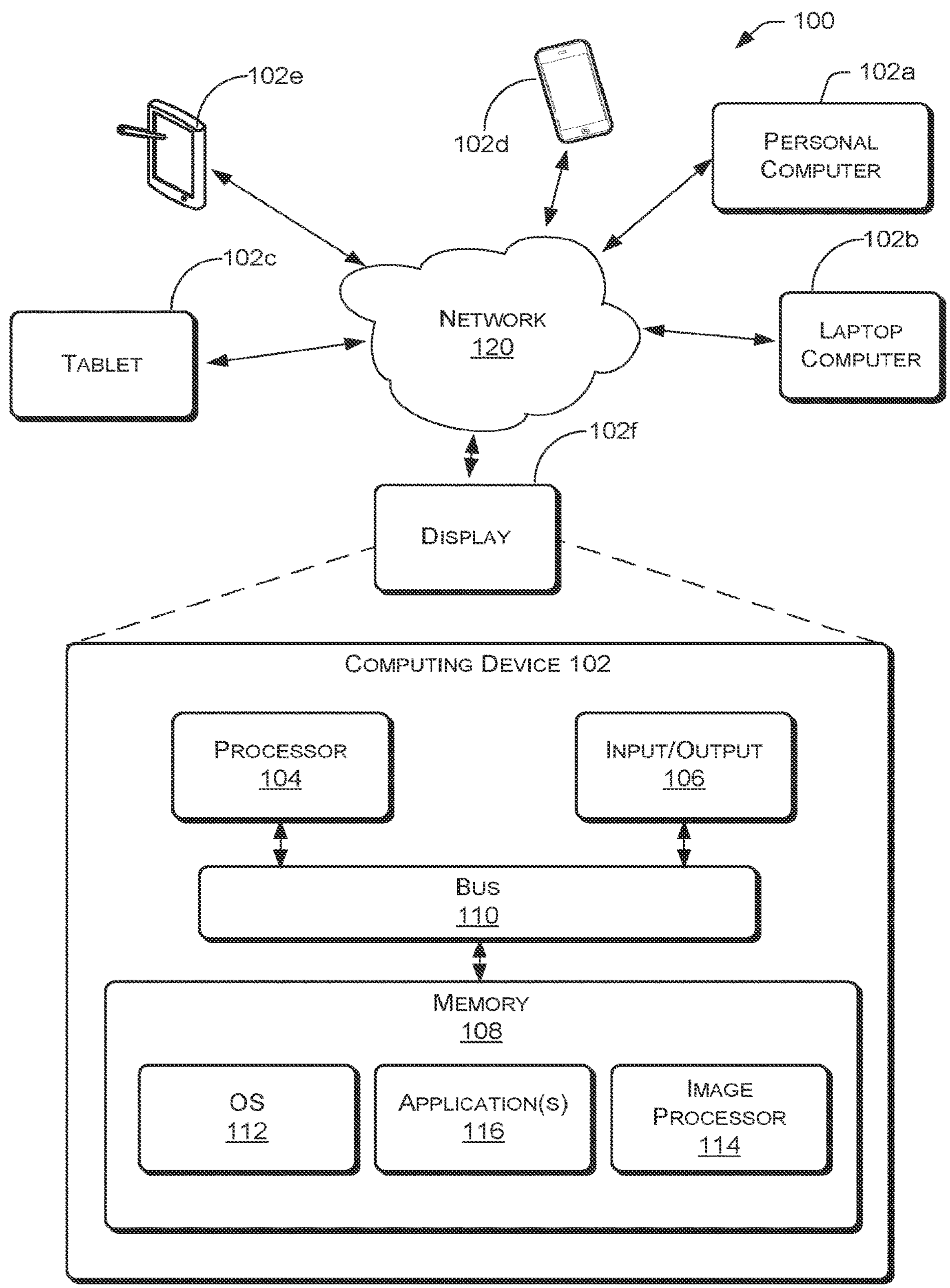
FIG. 1 is a block diagram depicting an example environment in which techniques described herein may be implemented.

A display may be used with devices such as game consoles, personal computers, tablet computers, smartphones, and so on. A display may be attached to a computer (s) or used as a client device (e.g., as terminals) for networks. A display may be integrated in the design of digital appliances such as personal digital assistants (PDAs), global positioning system (GPS) navigation devices, mobile phones, tablets, video games, electronic books (E-books), and so on.

Rather than using a mouse, touchpad, or any other intermediate device, some devices ("display devices") that include a display may enable a user to interact directly with display content (e.g., windows, menus, text, drawings, icons, images, and so on) that are displayed. In some examples, a display device (e.g., an electronic computing device that includes a display) may comprise a touchscreen that can sense and locate physical touch of an object (e.g., finger(s), stylus, and so on) on the display of the display device. A touchscreen may comprise an input device layered on top of or integrated with an electronic visual display of an information processing system.

Despite the advantages provided by a touchscreen of a portable electronic device, its relatively small input surface and available modalities generally limit the use of the device as a tool for content creation. For a relatively small touchscreen, for example, finger touch as input tends to have a relatively low resolution and the touching finger may occlude at least a portion (usually the portion of relatively high interest to the user) of the small display. Accordingly, tasks such as word processing or drawing applications may be difficult to implement on a small touchscreen. Despite this, a portable electronic device may be highly mobile, and it is, in many cases, the only digital device available to a user during periods of time. For example, a portable electronic device may be small enough to fit in a person's pocket or hand, so as to be considered a handheld device. Of course, examples herein apply to larger electronic devices, such as slates or relatively large displays.

In some examples, techniques and systems allow for various processes of interacting with an electronic display device, such as a portable display device. Such interaction may include inputting information to the display device and viewing information displayed by the display device. Such techniques and systems allow for a relatively large surface and/or volume for inputting the information by utilizing a surface in front of (or at least partially surrounding) the display device as well as the space above the surface. In this way, a user may use for input a relatively large surface and volume in place of (or in addition to) the relatively small display of the display device.

In a particular illustrative example, a user siting in a café places a phone (e.g., smartphone, display device) on a table. In this case, the phone is positioned on its edge (in landscape or portrait orientation) on the table (e.g., using a folding leg). The table area in front of the phone may be used for input, as if the table was a digitizing tablet or touch pad. The user may hold a pen-like object (a stylus, a pen, a coffee stirrer, a makeup pencil, etc.) and draw or write on the table in a natural way. The holding of the 'stylus' or 'pen' (herein referred to as "object") may enable better use of hand dexterity as compared to a touch interface. However, in some examples, a finger may additionally or alternatively be used as the object. Position and/or orientation of the object may be determined or sensed using an imaging sensor, such as a camera or a depth camera (either or both of which may be built into the phone or may be separate peripheral devices), for example.

Thus, in various examples, a display device may be configured to sense an object (e.g., finger(s), stylus, and so on) in a region about (e.g., in front of or around the location of) the display device. Sensing the object may include determining the location of the object in three-dimensions (3D location) relative to the display device or other reference point. For example, a system associated with a display may determine the location of an object in a 3D orthogonal coordinate system (e.g., X, Y, and Z axes), polar coordinate system, or cylindrical coordinate system relative to the display. In other examples, the system may determine the locations of the object at more than one time, and thus be able to determine motion, velocity, or gesture of the object. In some cases, a surface in front of the display device may be used as a "virtual touchscreen", where touch actions on the surface by an object may be similar to or the same as touch actions on an electronic touchscreen. Here, a user may provide input or control a processing system of the display device during a touch event using single or multi-touch gestures by touching the surface with a stylus/pen (or plural thereof), one or more fingers, one or more hands, or other body parts. The user may, for example, monitor the display to react to what is displayed and to control how content is displayed (for example by expanding (zooming) the text size, selecting menu items or objects, and so on) using touch events with the surface. Herein, a touch event may involve physical touch between an object (e.g., the user's finger(s), hand(s), stylus, or other object) and the surface (e.g., of a tabletop, paper, floor, flat surface, non-flat surface, or non-horizontal surfaces).

In some examples, mapping of a screen display to a surface may be dynamic so as to be able to change both in location as well as zoom (e.g., according to hand/tool position and/or gestures]. In some examples, a display may be used by multiple users, such as the case when one user is generating a sketch to better explain their meaning to another user. A decoupling ability of the input from the display may allow for the display to be uninterrupted during input on a surface by the one or more users. In some implementations, a system may consider and respond to hands of an active user (e.g. a user that is sketching or writing) while ignoring hands of other users.

In some configurations, if a finger of a user (or other object) touches a virtual touchscreen (e.g., surface), a "touchdown" event may be produced by an application programming interface (API). This event may be responsive to the finger having physically touched the virtual touchscreen. In some configurations, the event may involve information that may allow a processor, for example, to determine where on the virtual touchscreen the touchdown event occurred. In some examples, a system my sense a touchdown event by receiving a particular type of audio signal within a threshold amount of time after receiving an image of a possible touchdown event. The audio signal may correspond to the general sound of a touchdown event (e.g., stylus point hitting a surface) and may be used to confirm that the possible touchdown event in the image is a true touchdown event. In some examples, an accelerometer may be used in a same fashion as that of a microphone. In some examples, a conductive surface may be used to detect a touch of a stylus or other object(s) to the surface. In some examples, a wireless (e.g., Bluetooth) stylus (or wired stylus) may transmit information, such as pressure, or other parameters associated with a stylus up or stylus down event.

In other examples, a display device may be configured to sense a stylus/pen, one or more fingers, one or more hands, or other body parts or objects above a surface (e.g., above a virtual touchscreen), where physical contact with the surface need not be involved. Hereinafter, a stylus/pen, one or more fingers, one or more hands or other body part or object is hereinafter called an object (e.g., "object" in this context is a catch-all phrase that includes anything that may interact at or above a surface).

In some examples, the term "hover," (sometimes called "3D touch") is used to describe a condition where an object is positioned above (i.e., not in contact with) a surface, and is within a predetermined 3D space or volume above the surface. Accordingly, a hovering object may be defined as an object positioned above the surface within the predetermined 3D space without actually contacting the surface. The dimensions of the 3D space where hover interactions are constrained, and particularly a dimension that is perpendicular to the surface, may depend on the area of the surface and/or the context in which the surface is used, as will be described in more detail below. For example, the area of the surface may depend, at least in part, on a field of view of a camera (or cameras) that is used to sense the surface.

In various configurations, a "system" may be considered to include any combination of things. For example, in some configurations, a system may be considered to be a display and a processor. In other examples, a system may include memory, an image processor module, and a display. In still other examples, a system may include memory, a processor, a display, a camera(s), and a tabletop surface. Claimed subject matter is not limited in this respect.

In some example configurations, actions of the system may be based, at least in part, on the determination of location and/or orientation of an object. For example, the system may sense a particular gesture by the orientation of the object. The system may resultantly modify at least one element displayed by a display in response to such a gesture. Herein, the phrase "modifying at least one element displayed by a display" refers to a display changing what (e.g., windows, menus, icons, graphical objects, text, and so on) or how (e.g., brightness and/or contrast of particular portions of the touchscreen) the display displays the element(s) or display background, though claimed subject matter is not limited in this respect. In some examples, a system may modify behavior of a user interface associated with the display using information regarding the location and/or orientation of the object. Such behavior that may be modified includes, program execution (e.g., shifting execution from one set of codes to another set of codes (sub-routines), and displaying elements (as mentioned above), just to name a few examples.

The area of a display may be small relative to an input surface, which may lead to frequent desire to zoom in for viewing details, and zoom out to see the whole document. Accordingly, some examples may involve automatic zooming in and out based on action of a hover object(s). If a user touches (e.g., perhaps via an object) the surface, the display may show high details around the touch point. If the user discontinues the touch (e.g., lifts the tip of a pen from the surface), then the display may gradually zoom out to display the full document (less details, larger view).

Various examples are described further with reference to FIGS. 1-15.

The environment described below constitutes but one example and is not intended to limit the claims to any one particular operating environment. Other environments may be used without departing from the spirit and scope of the claimed subject matter.

FIG. 1 illustrates an example environment 100 in which example processes as described herein can operate. In some examples, the various devices and/or components of environment 100 include a variety of computing devices 102. By way of example and not limitation, computing devices 102 may include devices 102*a*-102*f*. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102*a*, laptop computers 102*b*, tablet computers 102*c*, telecommunication devices 102*d*, personal digital assistants (PDAs) 102*e*, a display 102*f*, electronic book readers, wearable computers, automotive computers, gaming devices, measurement devices, televisions, set top boxes, goggles, headset, etc. Computing devices 102 can also include business or retail oriented devices such as, for example, server computers, thin clients, terminals, and/or work stations. In some examples, computing devices 102 can include, for example, components for integration in a computing device, appliances, or other sorts of devices.

Herein, unless specifically noted to the contrary, "processor" may include one or more processors. Processor 104, for example, may be used to operate display 102*f*. For example, processor 104 may execute code to allow display 102*f* to display objects generated by any of a number of applications, which may also be executed by processor 104. Memory 108, which may be local (e.g., hard-wired in packaging of display 102*f* and processor 104) or remote (e.g., in a wired or wireless computer network), accessible to processor 104 may store such executable code or applications.

In some examples, some or all of the functionality described as being performed by computing devices 102 may be implemented by one or more remote peer computing devices, a remote server or servers, or a cloud computing resource.

In some examples, as shown regarding display 102*f*, memory 108 can store instructions executable by the processor 104 including an operating system (OS) 112, an image processor 114, and programs or applications 116 that are loadable and executable by processor 104. The one or more processors 104 may include one or more central processing units (CPUs), graphics processing units (GPUs), video buffer processors, and so on. In some implementations, image processor 114 comprises executable code stored in memory 108 and is executable by processor 104 to collect information, locally or remotely by computing device 102, via input/output 106. The information may be associated with one or more of applications 116. Image processor 114 may selectively apply any of a number of examples of colors, optical textures, images, and patterns, just to name a few examples, stored in memory 108 to apply to input data (e.g., captured images). For example, image processing may be involved in processes involving processor 104 interpreting or determining images of hovering objects based, at least in part, on information stored in memory 108.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs). Program-specific Integrated Circuits (ASICs), Program-specific Standard Products (ASSPs). System-on-a-chip systems (SOCs), Complex Programmable Logic Devices (CPLDs), etc.

In some examples, computing device 102 can be associated with a depth camera, which may be used to measure distances from the camera to various portions of an image captured by the camera. In some cases, individual pixels of the image may have associated distance data specifying the distance from the camera to the portion of the image corresponding to the respective pixel. In some examples, computing device 102 can be associated with a camera capable of capturing images and/or video and/or a microphone capable of capturing audio. Herein, unless specifically noted to the contrary, "camera" may include one or more cameras. For example, input/output module 106 can incorporate such a camera and/or microphone. Captured images of hover objects over a surface, for example, may be compared to images in a database of various objects and/or materials, and such comparing may be used, in part, to identify the hover objects. Memory 108 may include one or a combination of computer readable media.

In some examples, a camera may be sensitive to a non-visible band, such as a near IR camera. In some cases, the camera may be a LIDAR, a RADAR, or a stereo-depth camera. In some cases the camera may include a projection of structured light patterns, as a method to measure a distance map from the camera. In some cases the environment may include light (e.g., beam or spot) of a known position and the distance from a user's hand(s) or an object to the corresponding shadow on the surface may be used to estimate hover height. In some implementations, a reflective surface may be used, where the distance between the hand(s) and its reflection is used to estimate the hover height. In some examples, wearable tags (e.g., active tags such as band with sensors and display, or passive tags such as a plastic tag) worn on a hand(s), finger tags (e.g., fingernails with tags, or active fingernails), rings, stylus with a tag (passive or active), and so on may be used to track objects.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 108 is an example of computer storage media storing computer-executable instructions. When executed by processor 104, the computer-executable instructions configure the processor 104 to, in some examples, receive an image from a camera (the image may include a representation of a surface in the region and an object on or above the surface), analyze the image to determine a position, location, configuration, and/or an orientation of the object relative to the surface, a display, or the camera, determine a distance of at least a portion of the object above the surface, compare the image to at least one other image to determine whether position and the orientation of the object is a gesture or is a writing motion, and drive the display to display one or more display elements based, at least in part, on the position and the orientation of the object. Herein, "orientation" refers to rotational and/or translational position, as well as shape or configuration. Thus, orientation of a hand may refer to the hand's shape, silhouette, and rotational and/or translational position in 3D space. Herein, unless otherwise noted or disclosed by context, "hand" includes hand-proper, fingers, and thumb. Thus, orientation of a hand may refer to shape of the hand/finger/thumb combination.

In various examples, an input device of input/output (I/O) interfaces 106 can be an indirect input device (e.g., a mouse, keyboard, a camera or camera array, etc.), or another type of non-tactile device, such as an audio input device.

Computing device(s) 102 may also include one or more input/output (I/O) interfaces 106 to allow the computing device 102 to communicate with other devices. Input/output (I/O) interfaces 106 can include one or more network interfaces to enable communications between computing device 102 and other networked devices such as other device(s) 102. Input/output (I/O) interfaces 106 can allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

In some implementations any of a number of computing devices 102 may be interconnected via a network 120. Such a network may include one or more data centers that store and/or process information (e.g., data) received from and/or transmitted to computing devices 102, for example.

Figure 2:
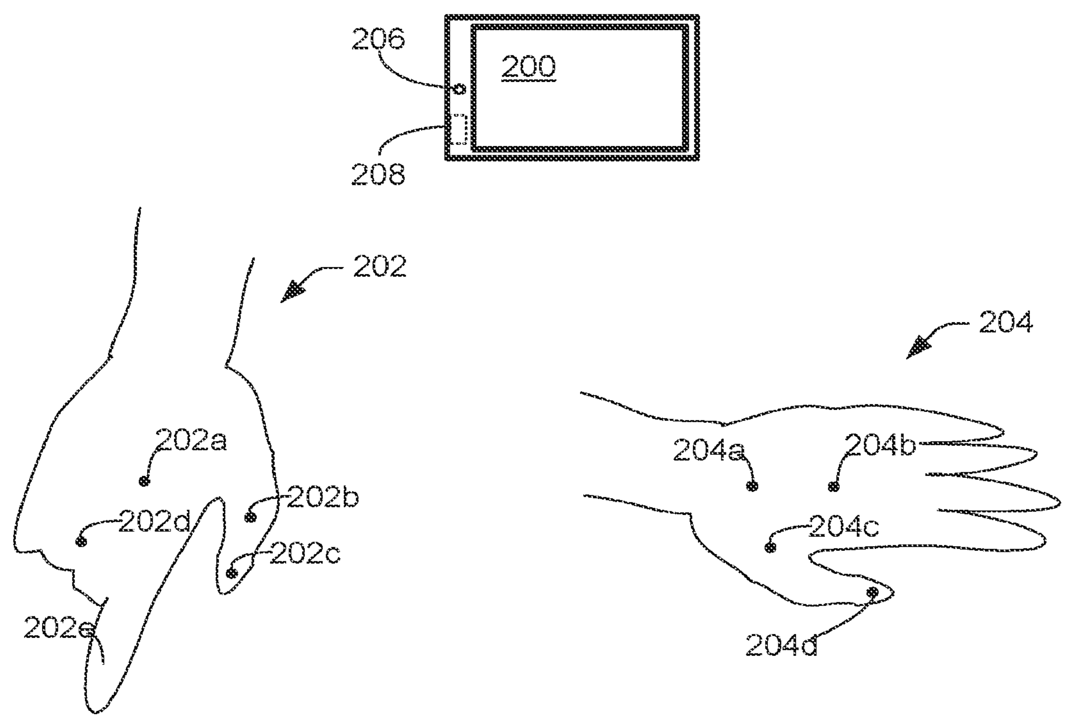
FIG. 2 illustrates gestures or hand positions for interacting with an example display device.

FIG. 2 illustrates example gestures or hand positions, which may be used to interact with a display device 200. In the examples illustrated, the gestures are made using hands 202 and 204, which may be the same hand (at different times) illustrated in differing orientations or multiple different hands. In other examples, gestures may be made using any of a number of objects, such as a stylus, pencil, etc., or any combination thereof. A camera 206 may be incorporated with display device 200. Camera 206 may capture images of hands 202 and 204, which may be located in a space in a field of view of the camera. For example, hands 202 and 204 may be a few millimeters to a meter or so from the camera, though claimed subject matter is not limited in this respect. A processor 208 in the display device may analyze the captured images to determine location or orientation of the hands 202 and 204. Such a location and orientation may be relative to a portion of display device 200 or a point on a surface (not illustrated in FIG. 2) over which hands 202 and 204 are located. In some examples, camera 206 may be a depth camera, which may be used to measure distances from the camera to various portions of an image captured by the camera. In some cases, individual pixels of the image may have associated distance data specifying the distance from the camera to the portion of the image corresponding to the respective pixel. In this way, camera 206 may be used to determine distance from the camera to a number of points on hand 202. Similarly, camera 206 may be used to determine distance from the camera to a number of points on hand 204. For example, some of such points are illustrated randomly on hands 202 and 204. Camera 206 may be used to determine distances from the camera to each of points 202*a*, 202*b*, 202*c*, 202*d*, and 202*e*. Accordingly, such distances may be used by processor 208 to determine, by some processes described below, a location and/or orientation of hand 202. Similarly, camera 206 may be used to determine distances from the camera to each of points 204*a*, 204*b*, 204*c*, and 204*d*. Accordingly, such distances may be used by processor 208 to determine, by some processes described below, a location and/or orientation of hand 204.

In some examples, hands 202 and 204 may be holding a stylus or other object. In such examples, camera 206 may be used to determine distances from the camera to each of a number of points on the stylus or other object. Accordingly, such distances may be used by processor 208 to determine a location and/or orientation of the styluses and hands (or combinations thereof).

In other examples, camera 206 need not be a depth camera, but instead may be a camera able to capture images without distance data. In these examples, an image processor may analyze images captured by the camera to determine location and/or orientation of hands 202 and 204, or other objects. In still other examples, one or more additional cameras may be included to capture images of objects from varying perspectives. For example, two properly placed cameras may capture stereo images of the hands or other objects. In this case, parallax may be a factor that helps processor 208 determine location and/or orientation of the hands or other objects.

Figure 3:
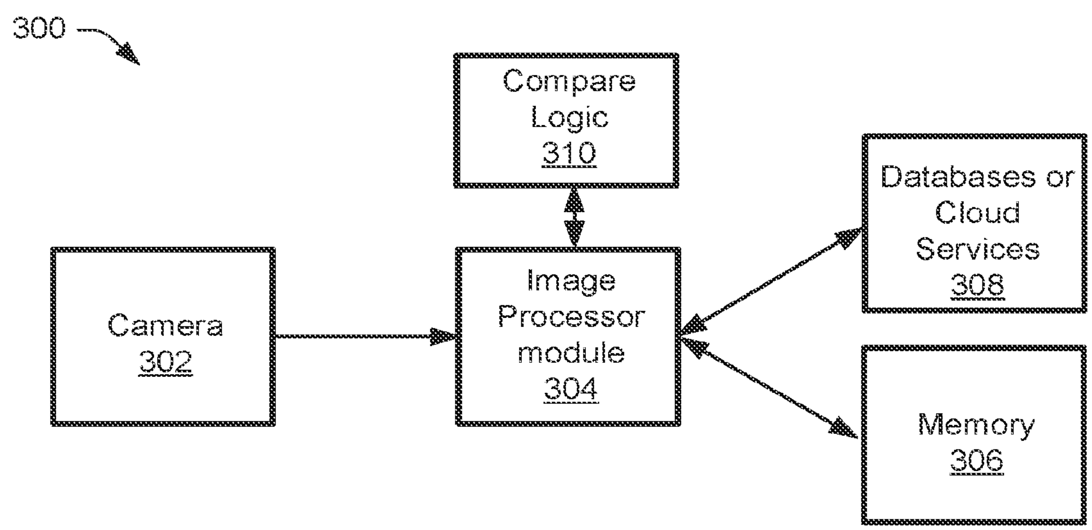
FIG. 3 is a block diagram of an example system that includes an image processing module.

FIG. 3 is a block diagram of an example system 300 that includes a camera 302, an image processor module 304, and a memory 306. For example, camera 302 may be the same as or similar to camera 206. Image processor module 304 may be the same as or similar to image processor module 114. In some examples, camera 302 may capture images (e.g., data representative of images) that are subsequently provided to image processor module 304, which may analyze features of objects in the images. In some cases, such objects may include a surface and other objects having at least a portion in contact with the surface. In other cases, such objects may include a surface and other objects (e.g., hover objects) not in contact with the surface. In still other cases, such objects may include a surface and a single object having at least a portion in contact or not in contact with the surface. For example, image processor module 304 may quantify (e.g., measure) positions, orientations, colors, and/or brightness of objects in the image. In some cases, image processor module 304 may discriminate among textures of objects based on optical characteristics of the objects. For example, an object (e.g., a stylus) having a smooth metallic surface may appear brighter in an image as compared to an object having a grooved or textured surface. For another example, an object (e.g., a finger) having a beige-colored surface may appear different and distinguishable in an image as compared to an object (e.g., a stylus) having a smooth metallic surface. For still another example, an object (e.g., paper on a tabletop) having edges and a (e.g., white) color that contrasts with that of a surface beyond the edges may appear different and distinguishable in an image as compared to an object (e.g., a tabletop with no paper thereon) having no detected edges (e.g., of the paper). For yet another example, an object (e.g., a tabletop) having no detected edges may appear different and distinguishable in an image as compared to an object (e.g., a hand laid flat on a tabletop) having a particular outline.

Image processor module 304 may access memory 306, which may store a database of image data including optical characteristics of materials, textures, outlines, possible orientations, and possible relative positions of candidate objects. In some examples, image processor module 304 may also, or instead, access any of a number of types of databases or memories accessible via the Internet or Cloud 308. Thus, for example, image processor module 304 may identify an object and access memory 306 in a process of identifying the type of object. In this fashion, image processor module 304 may determine whether an object is a stylus, a finger, hand, two or more fingers (and their positions or locations with respect to one another), a hand extended in a flattened position or any of a number of other positions, a tabletop, paper, paper on a table top, or any of a number of other types of objects in various orientations or positions. Such techniques performed by image processor module 304 may be extended to more than one object in an image. Such techniques performed by image processor module 304 may also enable system 300 to determine whether the object(s) is in contact with a surface (e.g., tabletop). In some examples, image processor module 304 may access a compare logic module 310 enabled to compare images to one another based, at least in part, on image analysis performed by image processor module 304.

In some configurations, subsequent to determining location(s) of an object(s), system 300 may modify any of a number of features or objects displayed by a display. Such features or objects may include, among other things, text, drawings, graphical objects, windows, menus, icons, brightness and/or contrast of particular portions of the display, and so on.

Figure 4:
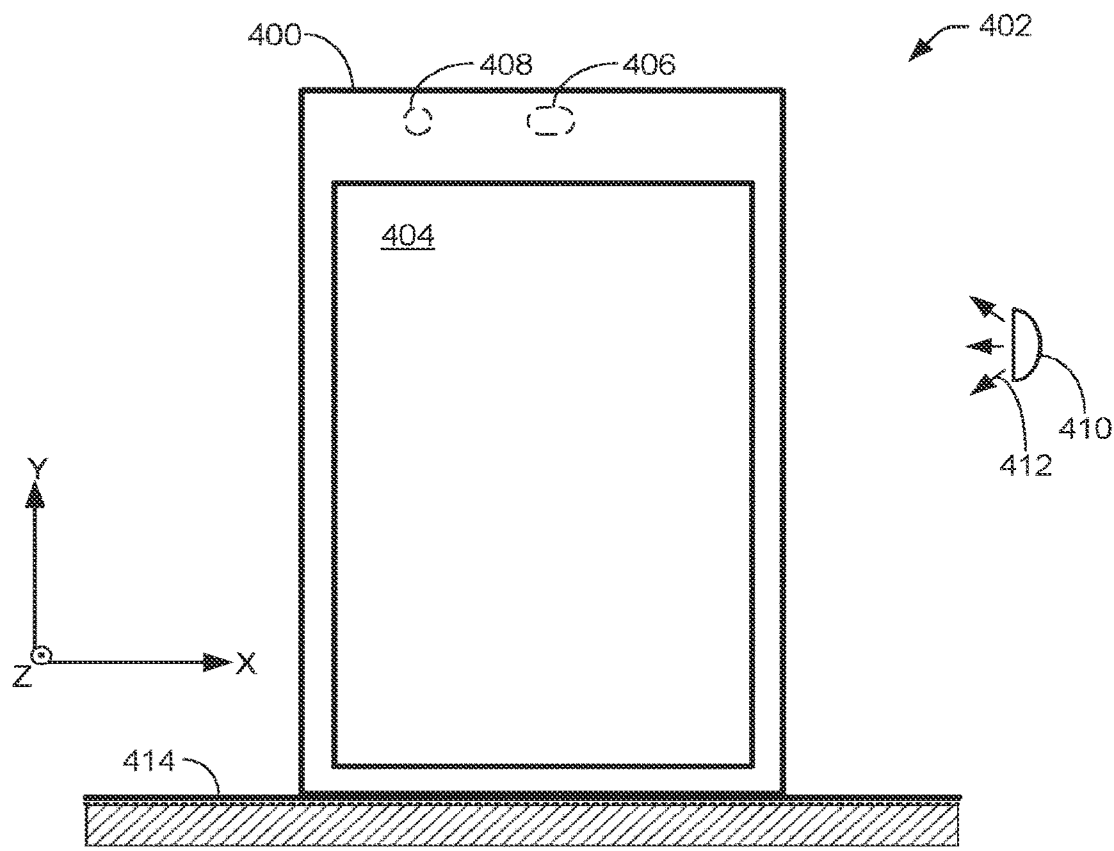
FIG. 4 is a front view of an example display device.

FIG. 4 illustrates a front view of an example display device 400 in an example environment 402 in which example processes as described herein can operate. Display device 400 may include a display 404 and a camera 406. In some examples, display 404 need not include a camera. In some examples, environment 402 may include a camera 410 external to (e.g., not co-located with) display device 400. FIG. 4 includes an orthogonal coordinate system comprising X, Y, and Z axes, where X and Y axes describe a plane parallel with display 404, and the Z-axis is perpendicular to the display (e.g., in the direction that "protrudes" out from the figure), as indicated by a circled dot.

Camera 406 may be similar to or the same as a front-facing camera that may be found on any of a number of types of display devices, such as smart phones, tablets, and so on. In some cases, camera 406 may be a depth camera. Camera 406 may have a field of view principally along the Z axis at a diverging angle so that, as Z increases, so does the area that is captured in an image.

In examples, camera 406, display device 400, and display 404 need not be perpendicular to a touch surface. In various examples, camera 406 may comprise front and/or rear facing cameras of some display devices.

Camera 406 may provide images to a processor, such as processor 104, for example, associated with display device 400. Such images may also (or instead) be provided to an image processor, such as image processor 114 or image processor module 304 (or a combination thereof). In some examples, a light sensor 408 may provide measurements of intensity and/or spectral information (e.g., spectrum of the ambient light) to the processor. Such measurements may also (or instead) be provided to the image processor. In some examples, light sensor 408 may comprise a photodiode, phototransistor, photocell, or other light-sensitive device. In some examples, a system may use measurements provided by light sensor 408 regarding ambient light in the region around display device 400. The system may adjust any of a number of features (e.g., resolution, brightness, colors, and so on) of displayed patterns, described below, in response to measured ambient light.

In some examples that include both camera 406 and an additional camera such as 410 (which may be a depth camera in some examples), the additional camera may have a field of view principally along the X or Y axes (or a combination of X and Y, or a combination of X, Y, and Z axes) at a diverging angle so that, as distance from the additional camera increases, so does the area that is captured in an image produced by the additional camera. Arrows 412 indicate a possible direction of view of camera 410. In some examples, camera 406 (and any other cameras, such as 410) may be configured to capture images (or a number of images such as for a video) in a region in front of and/or around display device 400 and above a surface 414, which may be a tabletop, desktop, floor, or other type of surface (which need not be horizontal or flat). In some cases, display device 400 may be resting (e.g., set down and disposed) on surface 414. For example, display device 400 may include a mechanical device, such as a kickstand (not illustrated) that allows the display device to stand upright on edge (in landscape or portrait orientation). In some cases, one or more objects captured in images by camera(s) (e.g., 406, 410) may be at least partially in contact with (e.g., touching) surface 414, while in other cases the one or more objects may be above surface 414 and not in contact with surface 414. In the latter cases, such an object(s) may be referred to as a hover object.

Figure 5:
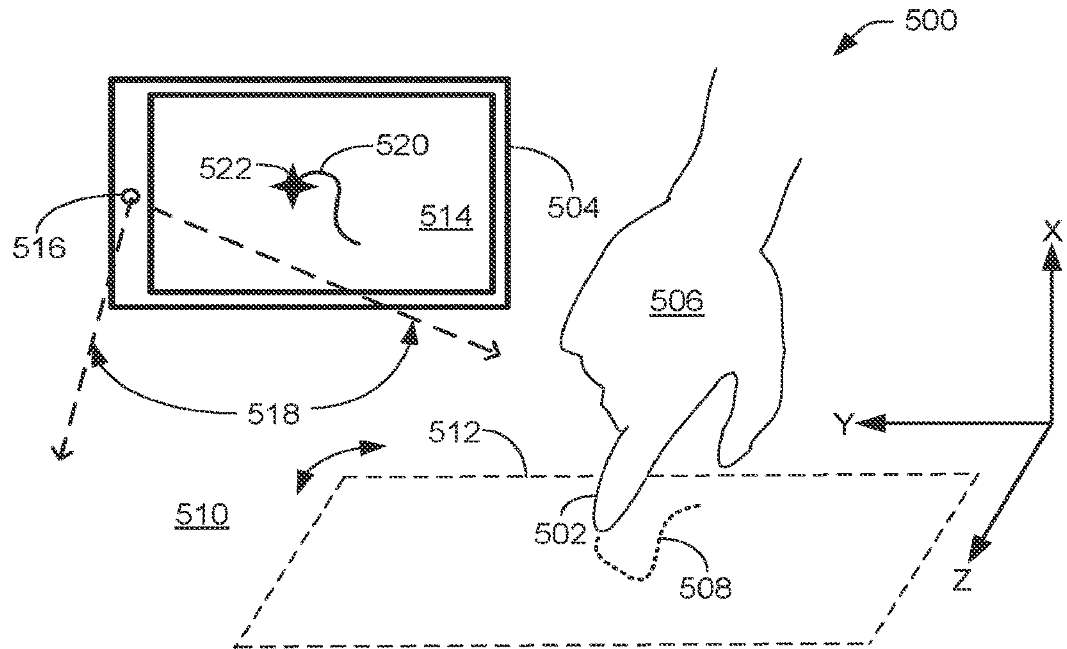
FIG. 5 is a perspective view of an object writing or gesturing in view of an example display device.

FIG. 5 is a perspective view of a system 500 including an object 502 in a region in front of a display device 504. In this example, object 502 is a finger of a user's hand 506. Object 502 may be tracing or "writing" a pattern, character, or shape 508 on a surface 510. In some cases, a piece of paper or other type of writing surface 512 may be disposed on surface 510. In other cases, paper need not be present and writing surface 512 may comprise a particular portion of surface 510. FIG. 5 includes orthogonal coordinate system comprising X, Y, and Z axes, corresponding to those illustrated in FIG. 4.

In some examples, display device 504 may be disposed on a portion of surface 510 that is some distance "behind" writing surface 512. Such a distance may be in a range from about a few centimeters up to about a meter or so, though claimed subject matter is not limited in this respect. In some examples, a user may be interacting with display device 504 using surface 510 or writing surface 512 while observing the display 514 of display device 504. In some examples, a user may be interacting with display device 504 directly and/or using surface 510, or writing on surface 512 while observing the display 514 of display device 504. Activities occurring on and in the 3D space above surface 510 may be shown in real time by display 514.

A camera 516, which may be disposed in display device 504 (e.g., such as camera 406), may have a field of view 518 that includes at least a portion of surface 510 (e.g., writing surface 512) and object 502. Though dashed arrows indicate that field of view 518 is along surface 510, the field of view may also include the 3D space above surface 510. Thus, images captured by camera 516 (and/or any other camera) may include objects in the space above surface 510, such as hand 506 of the user, as well as object 502 (finger of the hand), and edges of writing surface 512 (if present). The images may also include shape 508 if the shape is actually drawn (e.g., actual drawing or trace or motion sans an actual drawing) on writing surface 512, as opposed to where shape 508 is virtual, being merely a trace (e.g., movement along a path) by the finger. In some configurations, a user may use a pen or pencil on a paper surface (for example), and the ink or graphite traces on the paper may also be used to capture the pen/pencil motion by the camera(s).

In some examples, a processor of system 500 may use image processing techniques, such as those described above, for instance, to determine a number of things. For example, the processor of the system may determine if object 502 is a finger or a tip of a stylus. The system may detect orientation and position of hand 506 (and/or orientations and positions of individual fingers of hand 506), whether hand 506 is holding onto a stylus (not illustrated) or whether more than one finger (e.g., in addition to object 502) is in contact with writing surface 512. Detecting orientation and position may, for example, allow the processor of system 500 to determine, if present, gestures or motions of hand 506 (and/or of any other objects).

In some examples, multiple images (e.g., video or images captured periodically or from time to time in the order of milliseconds) may allow system 500 to sense if shape 508 is virtual. If shape 508 is real, then shape 508 may be captured in an image and compared to shapes in a memory using image processing techniques to determine if shape 508 is a particular character, such as that included in ASCII or UTF-8, for example. The processor of system 500 may "reproduce" shape 508 and object 502 in real time as display elements 520 and 522 in display 514 of display device 504. Display elements 520 and 522 may be scaled by any factor so that, for example, the display elements may be zoomed-in or zoomed-out representations of shape 508 and object 502. In some examples, further described below, such a scale factor may be based, at least in part, on a position and/or orientation of object 502 and hand 506. In another instance, the scale factor may be based, at least in part, on the position and/or orientation of another hand(s), stylus(es), object(s), and/or orientation of object 502 and hand 506. For example, the processor of system 500 may display the elements 520 and 522 in a close-up fashion with a relatively high resolution if object 502 is touching or is relatively near surface 510. On the other hand, as object 502 moves away from surface 510, system 500 may zoom out from elements 520 and 522 to display more of surface 510 in the region about object 502.

In some examples where writing surface 512 comprises a sheet of paper or writeable material, by image processing and analysis, the processor of system 500 may determine if, when, and by how much, writing surface 512 is rotated or translated on surface 510. Such motion (an example, of which is indicated by curved arrow) may be determined with respect to any of a number of reference points, such as a particular point on surface 510, a particular point on display device 504, or camera 516, for example.

Figure 6:
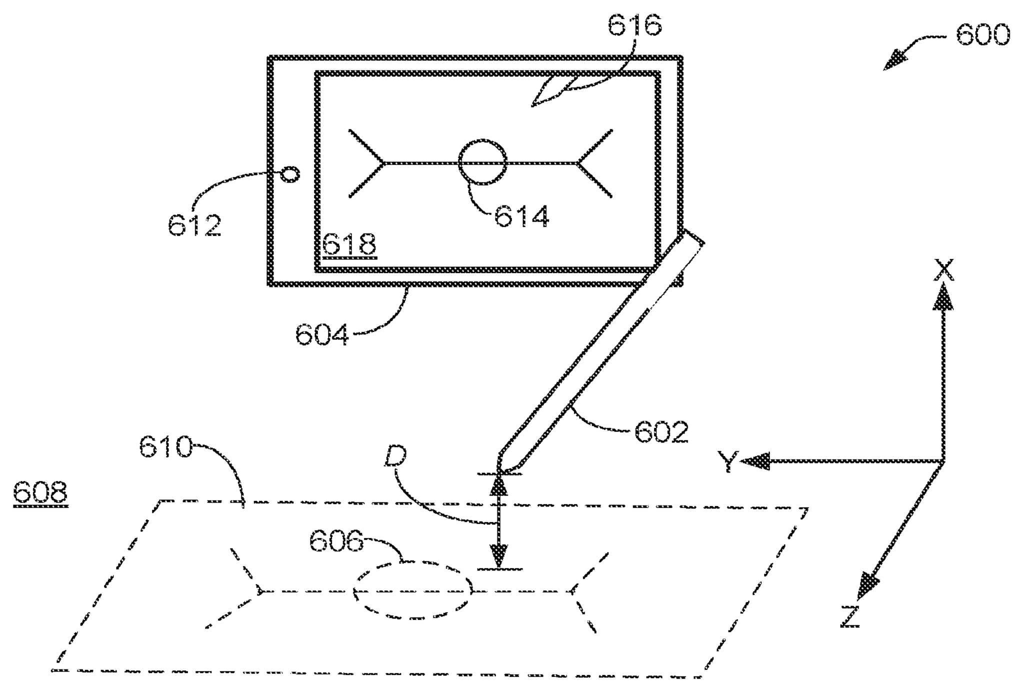
FIG. 6 is a perspective view of an example object a distance above a surface in view of a display device.
Figure 7:
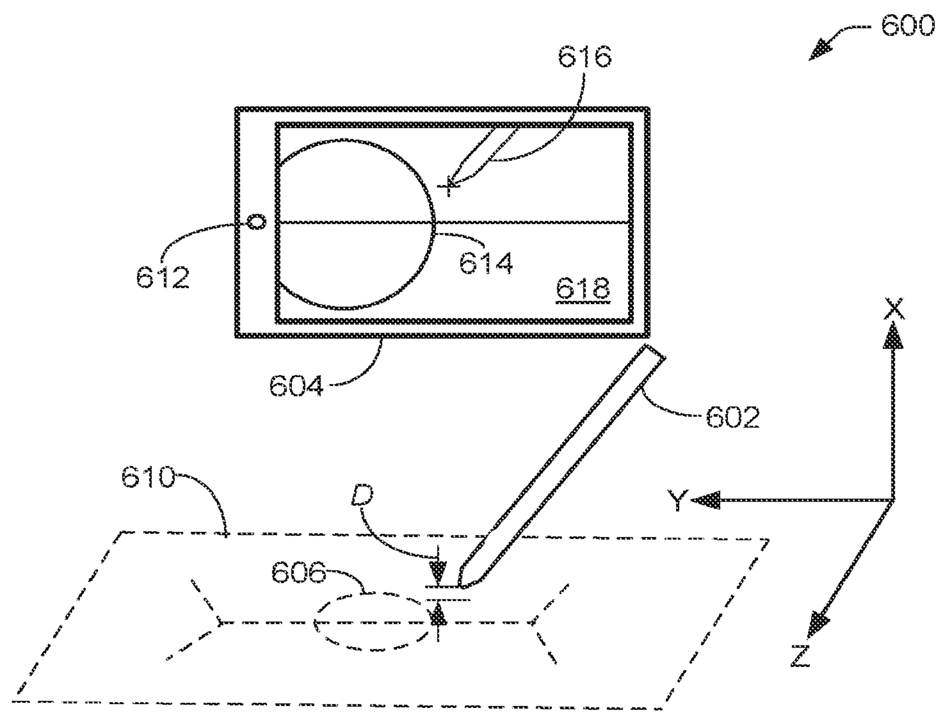
FIG. 7 is a perspective view of an object in view of an example display device.

FIGS. 6 and 7 are perspective views of a system 600 including an object 602 in a region in front of a display device 604. In this example, object 602 is a stylus, which may be held by a user's hand (not illustrated). Stylus 602 may be used to trace or "write" a character, shape, pattern, or drawing 606 on a surface 608. In some cases, a piece of paper or other type of writing surface 610 may be disposed on surface 608. In other cases, paper need not be present and writing surface 610 may comprise a particular portion of surface 608. A particular portion of stylus 602 is a distance D from writing surface 610. FIGS. 6 and 7 include orthogonal coordinate system comprising X, Y, and Z axes, corresponding to those illustrated in FIG. 4.

In some examples, display device 604 may be disposed on a portion of surface 608 that is some distance "behind" writing surface 610. Such a distance may be in a range from about a few centimeters up to about a meter or so, though claimed subject matter is not limited in this respect. A camera 612, which may be disposed in display device 604 (e.g., such as camera 406), may have a field of view that includes at least a portion of surface 608 (e.g., such as writing surface 610) and stylus 602. The field of view may also include the 3D space above surface 608. Thus, images captured by camera 612 (and/or any other camera) may include objects in the space above surface 608, such as stylus 602, the hand of the user that is holding stylus 602 (if present), and edges of writing surface 610 (if present). The images may also include drawing 606 if the drawing is actually drawn on writing surface 610, as opposed to where drawing 606 is virtual, being merely a trace (e.g., movement along a path) by the stylus.

In some examples, a processor of system 600 may use image processing techniques, such as those described above, for instance, to determine if stylus 602 is a finger or a tip of a stylus. The processor of the system may detect an orientation and position of a hand holding onto a stylus (not illustrated). In some examples, the processor may detect a portion of stylus 602 that may be used for writing or pointing to parts of writing surface 610. Using image processing techniques on an image(s) captured by camera 612, for example, the processor may determine distance D between the portion of stylus 602 that may be used for writing, drawing, and/or pointing and surface 608 (or 610).

The processor of system 600 may "reproduce" drawing 606 and stylus 602 in real time (and/or store associated information) as display elements 614 and 616, respectively, in display 618 of display device 604. Display elements 614 and 616 may be scaled by any factor so that, for example, the display elements may be zoomed-in or zoomed-out representations of drawing 606 and/or stylus 602. In some examples, such a scale factor may be based, at least in part, on distance D. Stylus 602, in some implementations, may include a pressure-sensitive button on its tip to sense when the stylus is pressed against a surface. The stylus may also (or instead) include an accelerometer to sense tilt and other orientations. For example, the processor of system 600 may display the elements 614 and 616 in a close-up fashion with a relatively high resolution in FIG. 7, where D is illustrated as being relatively small. On the other hand, as stylus 602 moves away from surface 610 and D increases, as in FIG. 6, the processor of system 600 may zoom out from elements 614 and 616 to display more of surface 610 in the region about stylus 602. Having the amount of zoom be responsive to the distance D may allow for the display to automatically zoom into and out from a displayed workspace to do editing or drafting. For example, in response to a user placing an editing or drafting tool (e.g., stylus) close to (or touching) surface 610, the display may zoom in to a displayed workspace centered about a point in the display that corresponds to the location of the drafting tool on surface 610. Similarly, in response to a user moving the editing or drafting tool away from surface 610, the display may zoom out from the displayed workspace so as to display a larger portion of the displayed workspace.

Figure 8:
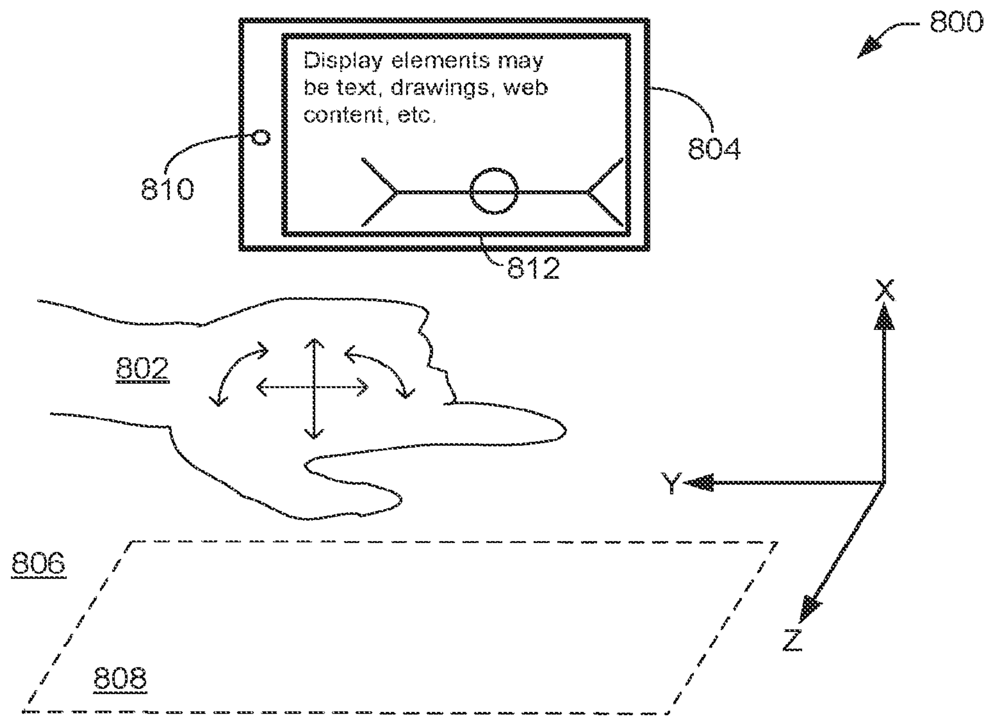
FIG. 8 is a perspective view of an object gesturing in view of an example display device.

FIG. 8 is a perspective view of a system 800 including a processor (e.g., processor 104) and an object 802 in a region in front of a display device 804. In this example, object 802 is a hand. FIG. 8 includes orthogonal coordinate system comprising X, Y, and Z axes, corresponding to those illustrated in FIG. 4.

In some examples, display device 804 may be disposed on a portion of surface 806 that is some distance "behind" writing surface 808. Such a distance may be in a range from about a few centimeters up to about a meter or so, though claimed subject matter is not limited in this respect. A camera 810, which may be disposed in display device 804, may have a field of view that includes at least a portion of surface 806 (e.g., such as writing surface 808) and object 802. The field of view may also include the 3D space above surface 806 so that orientations and/or locations of object 802 may be detected. Thus, images captured by camera 810 (and/or any other camera) may include objects in the space above surface 806, such as object 802 and writing surface 806 and/or 808.

Object 802 (being a hand in this example) may be used by a user to portray gestures by one or more of rotation, translation, finger extension or protraction, and so on. Herein, a gesture is considered to be a motion and/or orientation of a hand (or other body part, which may include a non-body part, such as a stylus) to express or help express intent for the processor to perform an action. For example, one gesture may be the hand (e.g., 802) having two fingers extended outward, another gesture may be the hand having one finger extended outward, and still another gesture may be the hand in a flat orientation, which may be motionless for at least a particular amount of time.

In some examples, a processor of system 800 may use image processing techniques, such as those described above, for instance, to determine a gesture portrayed by object 802. In some examples, the processor of the system may detect an orientation and position of object 802 by analyzing an image (or series of images), or depth data associated with the image(s), that includes object 802. The processor may compare the object in the image to shapes and gestures in a memory using image processing techniques. Finding a reasonable match (e.g., a close match or a match of image and shape parameters that are within predetermined threshold values) may lead to a determination by the processor of a gesture that corresponds to the orientation and/or location of object 802. The processor may map or translate the gesture into a command that may affect execution of code, which may change how elements (e.g., text, audio, drawings, and so on) in display 812 are being displayed, for example. In some examples, such gestures may be used to control pan and zoom of elements in display 812. In other examples, such gestures may be used to rotate or translate elements in display 812. In still other examples, such gestures may be used for any of a number of editing processes for elements in display 812, just to name a few examples.

In some examples, the orientations and/or locations of object 802 may change over time and a processor of the system may measure such changes to determine speed or velocity of the object or portions thereof. In this way, for example, the processor may detect user actions such as pinch motion to affect zoom or other displayed objects. In still other examples, the system may detect user actions such as hand or finger rotation (e.g., change of relative position of the fingers) to affect rotation of displayed objects.

Figure 9:
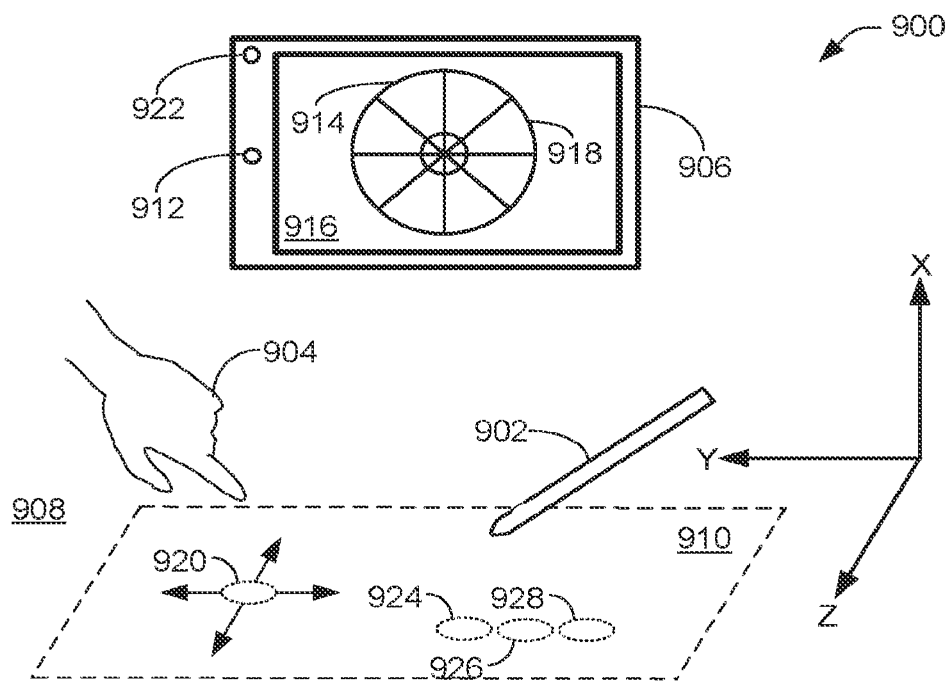
FIG. 9 is a perspective view of objects writing or gesturing in view of an example display device.

FIG. 9 is a perspective view of a system 900 including a processor (e.g., processor 104) and objects 902 and 904 in a region in front of a display device 906. Hereinafter, object 902 is considered to be a stylus or other elongated object (e.g., stick, coffee stirrer, hairpin, and so on) and object 904 is considered to be a hand, though claimed subject matter is not limited in this respect. FIG. 9 includes orthogonal coordinate system comprising X, Y, and Z axes, corresponding to those illustrated in FIG. 4.

In some examples, display device 906 may be disposed on a portion of surface 908 that is some distance "behind" writing surface 910. Such a distance may be in a range from about a few centimeters up to about a meter or so, though claimed subject matter is not limited in this respect. A camera 912, which may be disposed in display device 906, may have a field of view that includes at least a portion of surface 908 (e.g., such as writing surface 910), stylus 902, and hand 904. The field of view may also include the 3D space above surface 908 so that orientations and/or locations of stylus 902 and hand 904 may be detected. Thus, images or video (e.g., multiple images) captured by camera 912 (and/or any other camera) may include objects in the space above surface 908, such as stylus 902, hand 904, and writing surface 910 and/or 908.

In some examples, motion, location, and/or orientation of stylus 902 and hand 904 (or portions thereof) may be used to operate a radial menu 914 that is displayed on display 916. In some cases, radial menu 914 may comprise various drawing colors, textures, features, edit commands, etc. in respective regions 918. For example, some command classes may be implemented by a finger of hand 904 touching surface 908 at a location 920, holding the touch position to enter a particular input mode, then dragging the finger in any of a number of directions, such as those indicated by the radial arrows in the figure. In some cases, the touch (e.g., a touchdown event) may be detected by audio input of a microphone 922, which may be built into display device 906. In some cases, the sound produced by the touch in combination with images or video of the touching finger, as captured by camera 912, may be used to detect the touch. In other cases, the touch (e.g., a touchdown event) may be detected by analyzing images that include a finger and a shadow of the finger converging at a point or region on a surface.

In another example, some command classes may be implemented by a finger of hand 904 touching surface 908 at a location 920, holding the touch position to enter a particular input mode, then dragging or flicking finger and/or stylus 902 in a particular direction. In still another example, some command classes may be implemented by more than one finger of hand 904 touching surface 908 at locations, such as 924, 926, and/or 928, holding the touch positions beyond a threshold amount of time to enter a particular input mode, then dragging and/or flicking the fingers or stylus in a particular direction. In still another example, some command classes may be implemented by tapping one or more fingers of hand 904 against surface 908. Such tapping may be detected by the sound produced by the tapping, images or video of the tapping finger(s), or both. In some examples, different radial menus may be displayed based, at least in part, on the number of fingers touching a surface.

Figure 10:
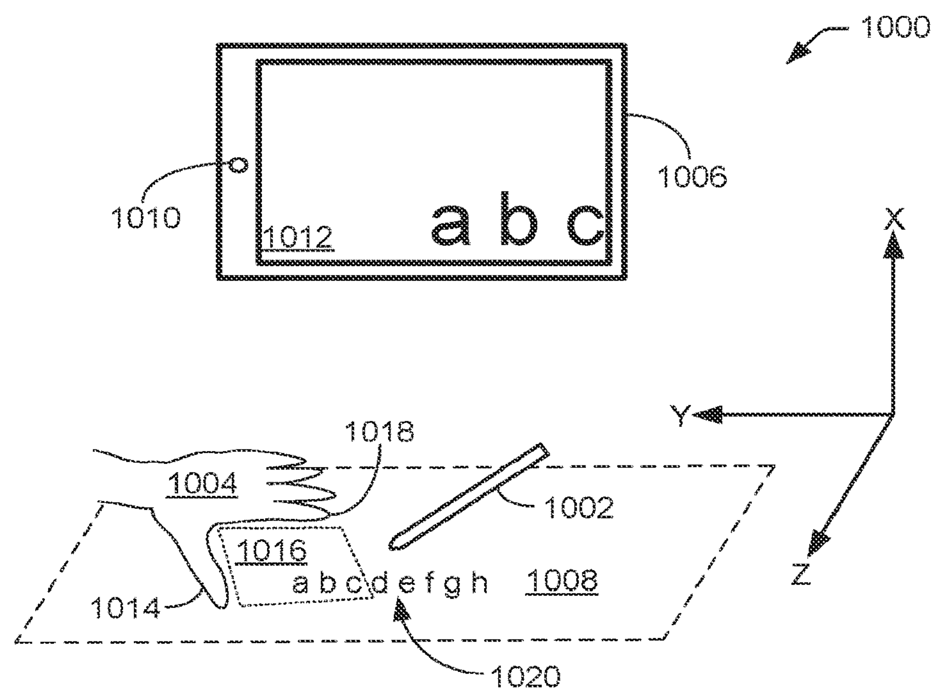
FIG. 10 is a perspective view of objects writing or gesturing to establish an area of a surface for display in an example display device.

FIG. 10 is a perspective view of a system 1000 including a processor (e.g., processor 104) and objects 1002 and 1004 in a region in front of a display device 1006. Hereinafter, object 1002 is considered to be a stylus or other elongated object and object 1004 is considered to be a hand, though claimed subject matter is not limited in this respect. FIG. 10 includes orthogonal coordinate system comprising X, Y, and Z axes, corresponding to those illustrated in FIG. 4.

In some examples, display device 1006 may be disposed on a portion of surface 1008 that is some distance "behind" stylus 1002 and hand 1004. Such a distance may be in a range from about a few centimeters up to about a meter or so, though claimed subject matter is not limited in this respect. A camera 1010, which may be disposed in display device 1006, may have a field of view that includes at least a portion of surface 1008, stylus 1002, and hand 1004. The field of view may also include the 3D space above surface 1008 so that orientations and/or locations of stylus 1002 and hand 1004 may be detected. Thus, images or video (e.g., multiple images) captured by camera 1010 (and/or any other camera) may include objects in the space above surface 1008, such as stylus 1002, hand 1004, and surface 1008.

In some examples, motion, location, and/or orientation of stylus 1002 and hand 1004 (or portions thereof) may be used to control elements displayed on a display 1012 and/or the display itself. In some cases, such control may include establishing scaling factors between drawn objects (e.g., characters, drawings, etc. (either actually or virtually drawn) on surface 1008 and the size and location of the drawn objects as displayed on display 1012. For example, a particular gesture comprising hand 1004 flattened with fingers and thumb 1014 extended may be interpreted as a command to operate display 1012 to display the drawn objects with a scale that is one-to-one with those drawn on surface 1008. In some examples, an area 1016 on surface 1008 that is defined by extended thumb 1014 and index finger 1018 may be interpreted by the processor as a command to control display 1012 to display area 1016 and any objects, virtual or real, that have been drawn in this area. In other examples, such an area, having properties described herein, may be defined or established using other gestures, and claimed subject matter is not limited in this respect. In this case, area 1016 and the objects it includes may be displayed with a relatively high resolution because substantially all of display 1012 is used to display area 1016. In some examples, area 1016 may be translated or rotated on surface 1008 corresponding to movements of hand 1004 (maintaining extended thumb 1014 and index finger 1018).

While area 1016 continues to be defined and maintained by the gesture of hand 1014, any objects, virtual or real, that have been drawn on surface 1008 may be displayed by display 1012 if the objects are within a boundary of area 1016. Accordingly, as hand 1014 moves in different portions of surface 1008, so does area 1016, and objects that become encompassed by the boundary of area 1016 are displayed. For example, the portion of text string 1020 that is within the boundary of area 1016 may be displayed in display 1012, as illustrated (e.g., "a b c" is displayed). If, however, hand 1004 moved to the right so that the portion of text string 1020 that is within the boundary of area 1016 includes additional letter "d e", then "a b c d e" will be displayed. If hand 1004 moved further to the right so that the portion of text string 1020 that is within the boundary of area 1016 no longer includes the letter "a" but does include letters "b c d e f", then "a" is no longer displayed while "b c d e f" is displayed. Such letters, for example, may be drawn by stylus 1002 virtual (e.g., the tip of the stylus follows traces of the letters but no actual writing on surface 1008 occurs) or real (e.g., the tip of the stylus includes a writing substance, such as ink, follows traces of the letters, and actual writing on surface 1008 occurs). In this example, if stylus 1002 draws real or virtual letters, this drawing process, and the resulting letters, may be displayed by display 1012 in real time if the letters are within the boundary of area 1016. On the other hand, if stylus 1002 draws real letters, this drawing process, and the resulting letters, may not be displayed by display 1012 in real time if the letters are outside the boundary of area 1016. The letters, however, may be displayed later if hand 1004 moves so that the boundary of area 1016 encompasses the letters. In contrast, if stylus 1002 draws virtual letters, this drawing process, and the resulting letters, may never be displayed by display 1012 if the letters are outside the boundary of area 1016.

In some examples, the system may recognize that a pen (or other object) is tucked in the hand holding the pen and that only the index finger of the hand is at substantially zero distance from the surface (e.g., 1008), so the index finger may automatically switch mode to trace a lasso (e.g., in order to be able to select objects on the page). In some examples, the system may recognize that the pen is tucked in the hand and that two fingers of that hand are at substantially zero distance from the surface (e.g., 1008). Instead of using the pinch to zoom a whole page, a small magnifier may appear between the fingers on the display and magnify just this area. In yet other examples, a user may trace with a stylus (e.g., in the dominant hand) while simultaneously positioning the workspace (pan/flick/zoom) with the other hand (e.g., in the non-dominant hand).

Figure 11:
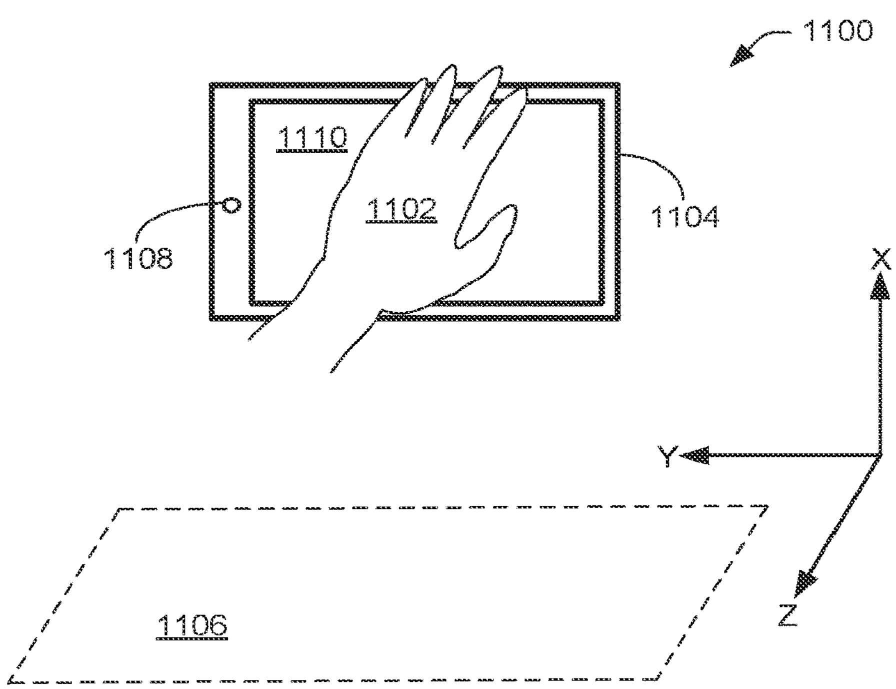
FIG. 11 is a perspective view of an object gesturing in view of an example display device.

FIG. 11 is a perspective view of a system 1100 including a processor (e.g., processor 104) and an object 1102 in a region in front of a display device 1104. In this example, object 1102 is a hand. FIG. 11 includes orthogonal coordinate system comprising X, Y, and Z axes, corresponding to those illustrated in FIG. 4.

In some examples, display device 1104 may (or may not) be disposed on a portion of surface 1106. A camera 1108, which may be disposed in display device 1104, may have a field of view that includes hand 1102. For example, the field of view may include the 3D space above surface 1106 so that orientations and/or locations of object hand may be detected. Thus, images captured by camera 1108 (and/or any other camera) may include surface 1106 and objects in the space above surface 1106, such as hand 1102.

Hand 1102 may be used by a user to portray gestures by rotation, translation, finger extension or protraction, and so on. For example, such gestures may be portrayed by hand 1102 being relatively close (e.g., less than 20 or 30 centimeters) to display 1110 of display device 1104. Gestures may comprise particular shapes or orientations of hand 1102, which may be held in front of display 1110 or passed across the field of view of camera 1108. For example, one gesture may be hand 1102 in a flat configuration. In another example, a gesture may be hand 1102 in a fist-like configuration. Other gestures may involve hand 1102 having one or more fingers extended. In some examples, image analysis of captured images may be used to determine if a particular hand is a right hand or a left hand of a user. Commands associated with a particular gesture portrayed by a right hand may differ from the same particular gesture portrayed by a left hand, for example.

In some examples, a processor of system 1100 may use image processing techniques, such as those described above, for instance, to determine a gesture portrayed by hand 1102. In some examples, the processor of the system may detect a shape, orientation, and/or position of hand 1102 by analyzing an image, or depth data associated with the image, that includes hand 1102. The processor may compare the object in the image to shapes and gestures in a memory using image processing techniques. Finding a reasonable match (e.g., a close match or a match of image and shape parameters that are within predetermined threshold values) may lead to a determination by the processor of a gesture that corresponds to the shape, orientation, and/or location of hand 1102. The processor may map or translate the gesture into a command that may affect execution of code, which may change how elements (e.g., text, audio, drawings, and so on) in display 1110 are being displayed, for example. In some examples, such gestures may be used to control pan and zoom of elements in display 1110. In other examples, such gestures may be used to rotate or translate elements in display 1110. In still other examples, such gestures may be used for any of a number of editing processes for elements in display 1110, just to name a few examples.

In some examples, the shape, orientation, and/or location of hand 1102 may change over time and the processor of the system may measure such changes to determine speed or velocity of the hand or portions thereof. In this way, for example, the processor may detect user actions such as hand 1102 being swiped to the left or to the right. In still other examples, the system may detect user actions such as hand 1102 rotation.

Figure 12:
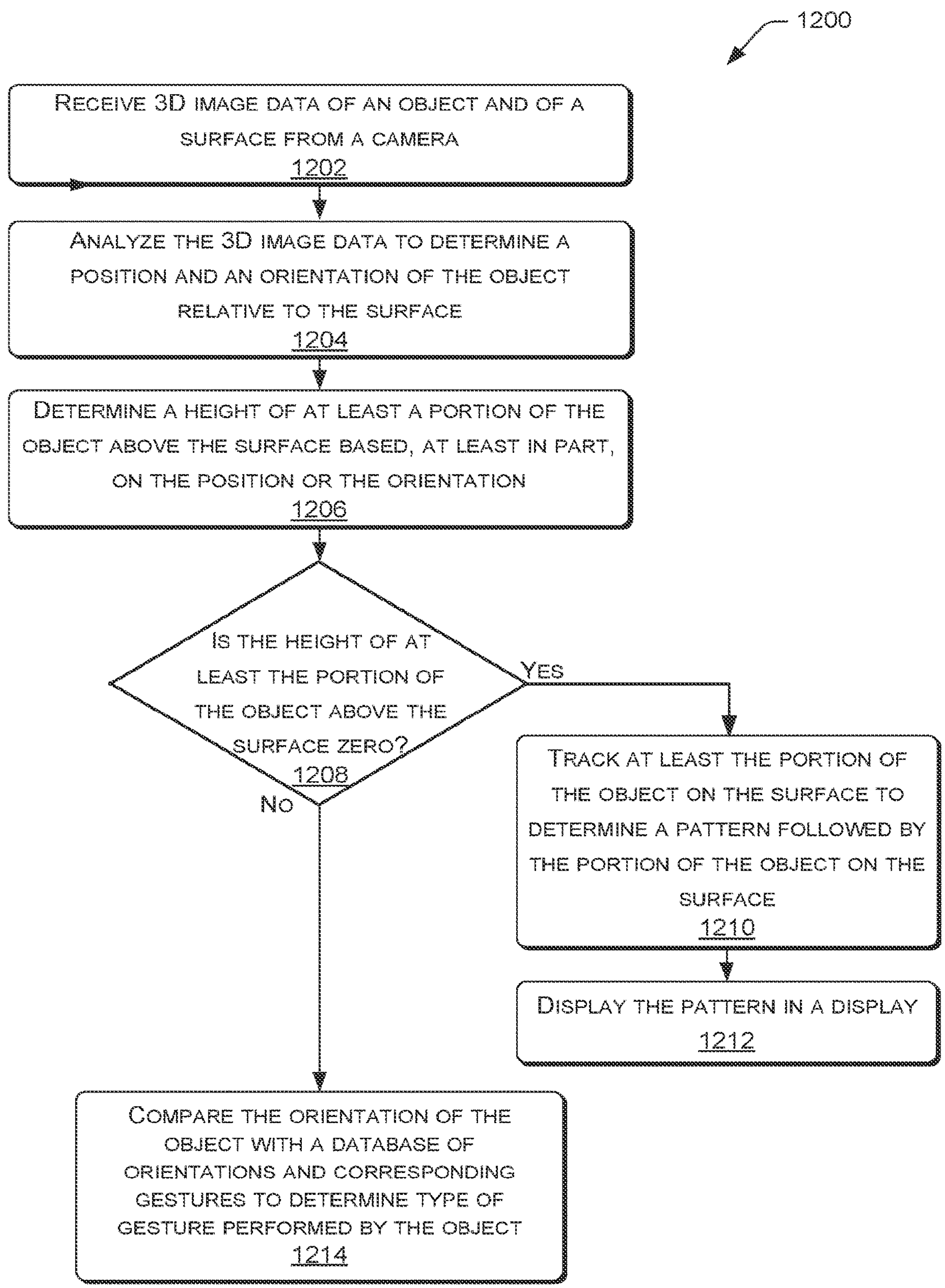
FIG. 12 is a flow diagram of an example process for determining a type of gesture for a user interface.

FIG. 12 is a flow diagram of an example process 1200 for operating a user interface. Process 1200 may be performed by a processor, for example. For example, process 1200 may be performed by computing device 102, illustrated in FIG. 1. At block 1202, the processor may receive image data of an object and of a surface from a camera. At block 1204, the processor may analyze the image data to determine a position and an orientation of the object relative to the surface. At block 1206, the processor may determine a distance (e.g., height) of at least a portion of the object above the surface based, at least in part, on the position or the orientation. At diamond 1208, the processor may determine whether the distance of at least the portion of the object above the surface is substantially zero. If so the process 1200 proceeds to block 1210 where the processor may track at least the portion of the object on the surface to determine a pattern followed by the portion of the object on the surface. At block 1212, the processor may display the pattern in a display. On the other hand, if the distance of at least the portion of the object above the surface is not substantially zero (e.g., such as being above a threshold value), then the process 1200 proceeds to block 1214 where the processor may compare the orientation of the object with a database of orientations and corresponding gestures to determine type of gesture performed by the object.

Figure 13:
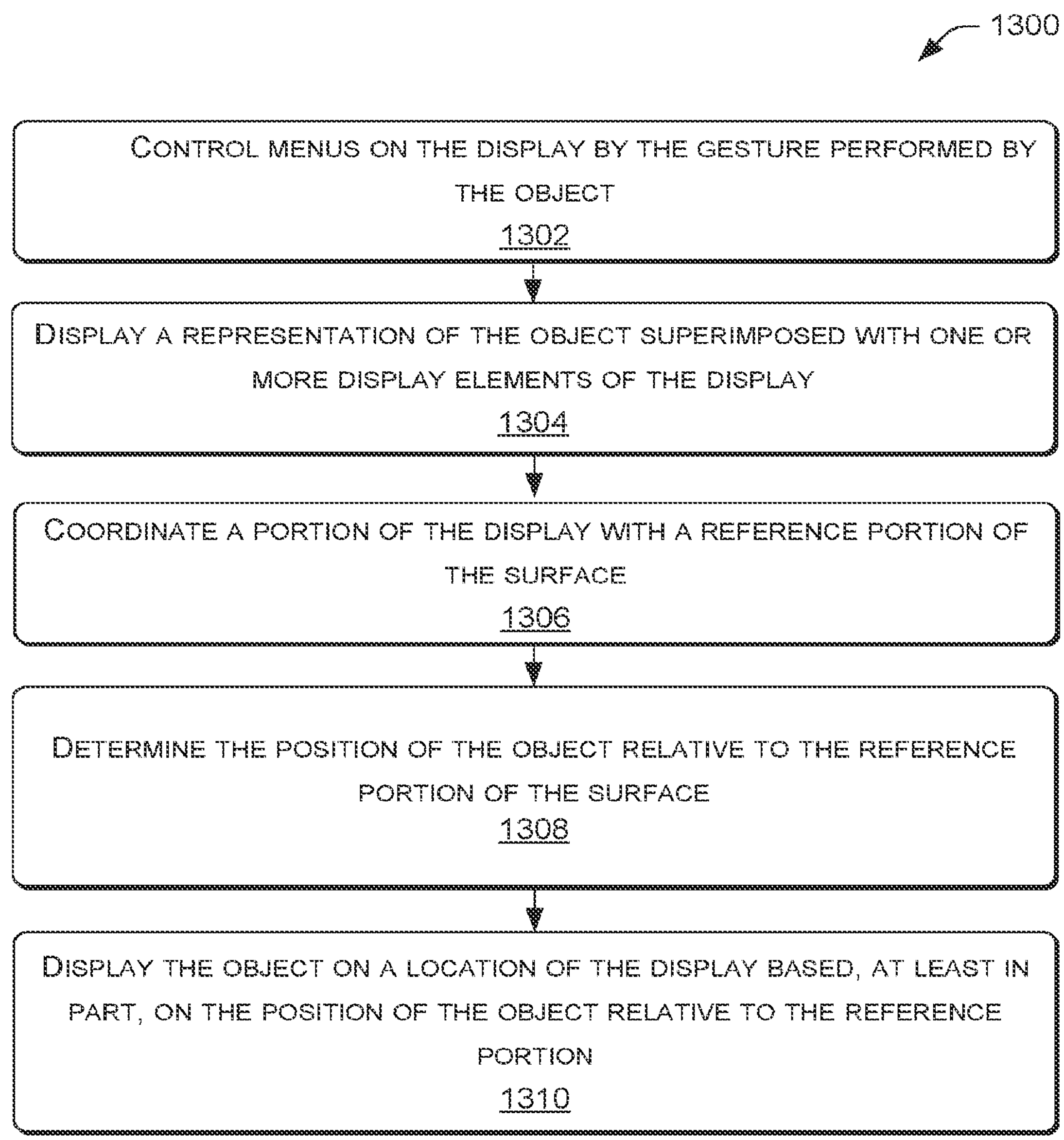
FIG. 13 is a flow diagram of example processes for operating a display and a user interface.

FIG. 13 is a flow diagram of an example process 1300 for operating a user interface. In some examples, process 1300 may be a continuation of process 1200. Each block of process 1300 may be executed independently of the other blocks so that all blocks need not be executed. Process 1300 may be performed by a processor, for example. For example, process 1300 may be performed by computing device 102, illustrated in FIG. 1. At block 1302, the processor may control menus on the display by the gesture performed by the object. At block 1304, the processor may display a representation of the object superimposed with one or more display elements of the display.

At block 1306, the processor may coordinate a portion of the display with a reference portion of the surface. At block 1308, the processor may determine the position of the object relative to the reference portion of the surface. At block 1310, the processor may display the object on a location of the display based, at least in part, on the position of the object relative to the reference portion.

Figure 14:
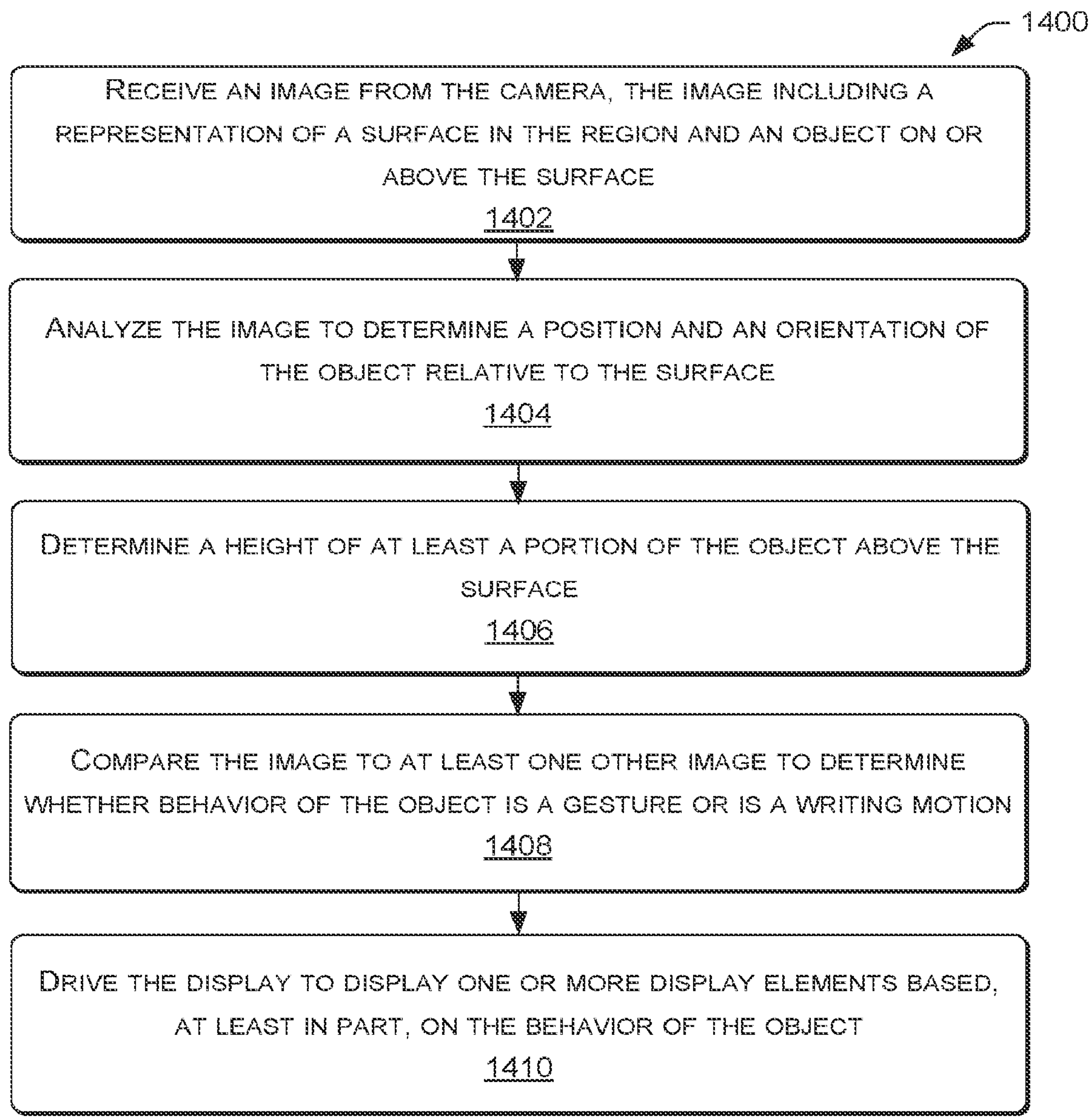
FIG. 14 is a flow diagram of example processes for operating a user interface.

FIG. 14 is a flow diagram of an example process 1400 for operating a user interface. Process 1400 may be performed by a processor, for example. For example, process 1400 may be performed by computing device 102, illustrated in FIG. 1. At block 1402, the processor may receive an image from the camera, the image including a representation of a surface in the region and an object on or above the surface.

At block 1404, the processor may analyze the image to determine a position and an orientation of the object relative to the surface. At block 1406, the processor may determine a distance of at least a portion of the object above the surface. At block 1408, the processor may compare the image to at least one other image to determine whether position and the orientation of the object is a gesture or is a writing motion. At block 1410, the processor may drive the display to display one or more display elements based, at least in part, on the position and the orientation of the object.

Figure 15:
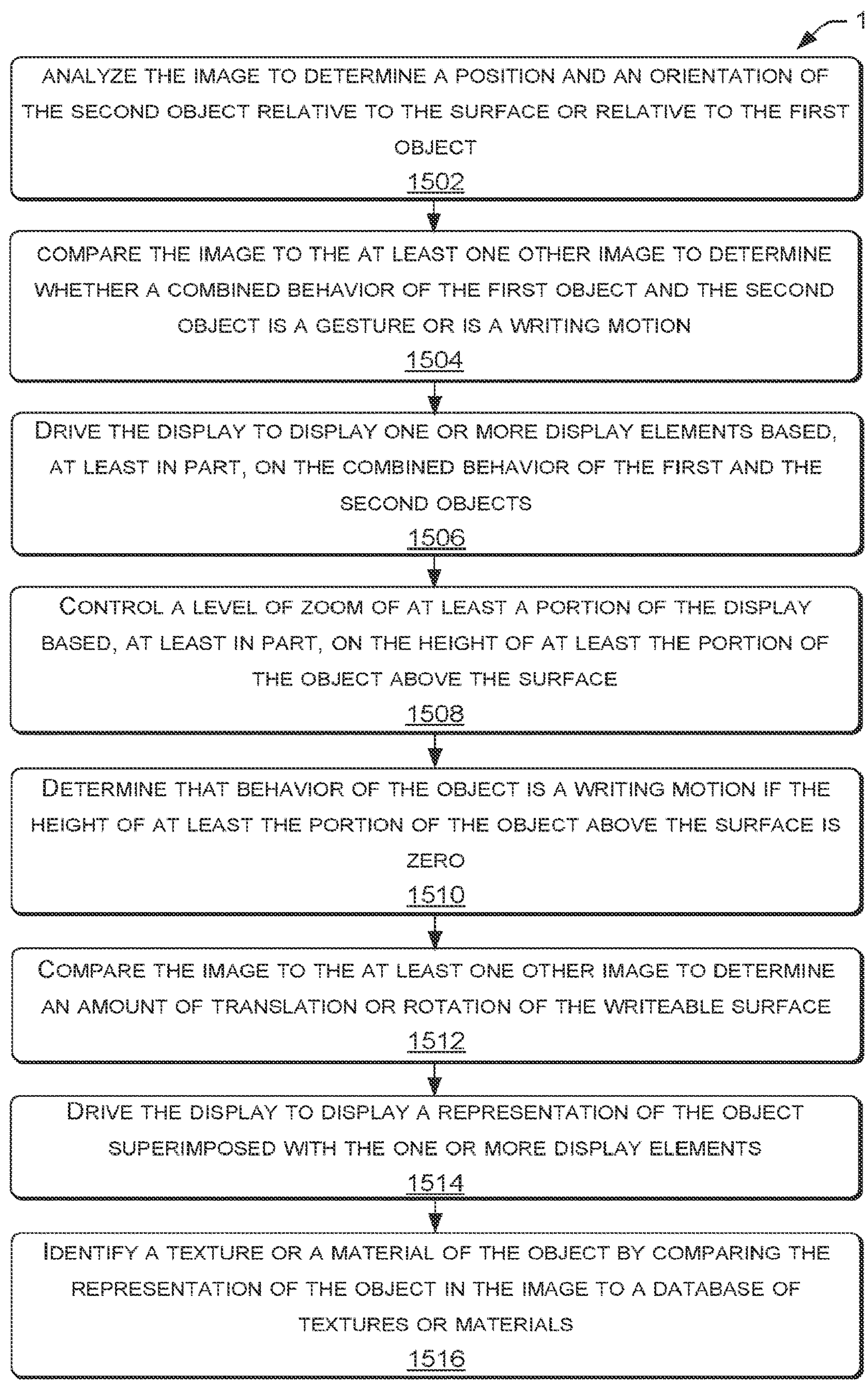
FIG. 15 is a flow diagram of example processes for operating a display and a user interface.

FIG. 15 is a flow diagram of an example process 1500 for operating a user interface. In some examples, process 1500 may be a continuation of process 1400. Each block of process 1500 may be executed independently of the other blocks so that all blocks need not be executed. Process 1500 may be performed by a processor, for example. For example, process 1500 may be performed by computing device 102, illustrated in FIG. 1. At block 1502, the processor may analyze the image to determine a position and an orientation of the second object relative to the surface or relative to the first object.

At block 1504, the processor may compare the image to the at least one other image to determine whether a combined behavior of the first object and the second object is a gesture or is a writing motion. At block 1506, the processor may drive the display to display one or more display elements based, at least in part, on the combined behavior of the first and the second objects. At block 1508, the processor may control a level of zoom of at least a portion of the display based, at least in part, on the distance of at least the portion of the object above the surface. At block 1510, the processor may determine that behavior of the object is a writing motion if the distance of at least the portion of the object above the surface is zero. At block 1512, the processor may compare the image to the at least one other image to determine an amount of translation and/or rotation of the writeable surface. At block 1514, the processor may drive the display to display a representation of the object superimposed with the one or more display elements. At block 1516, the processor may identify a texture or a material of the object by comparing the representation of the object in the image to a database of textures or materials.

The flows of operations illustrated in FIGS. 12-15 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any descriptions, elements, or blocks in the flows of operations illustrated in FIGS. 12-15 may represent modules, segments, or portions of code that include one or more executable instructions for implementing specific logical functions or elements in the routine.

EXAMPLE CLAUSES

A. A system comprising: a display operable by one or more processors; a camera configured to capture images of a region external to the display; and a memory storing instructions that, when executed by the one or more processors, cause the one or more processors to perform operations comprising: receiving an image from the camera, the image including a representation of a surface in the region and an object on or above the surface; analyzing the image to determine a position and an orientation of the object relative to the surface; determining a distance of at least a portion of the object above the surface; comparing the image to at least one other image to determine whether the position and the orientation of the object corresponds to a gesture or a writing motion; and driving the display to output one or more display elements based, at least in part, on whether at least one of the position and the orientation of the object corresponds to the gesture or the writing motion.

B. The system as paragraph A recites, wherein the object is a first object, wherein the image further includes a representation of a second object, and wherein the stored instructions, when executed by the one or more processors, cause the one or more processors to perform operations comprising: analyzing the image to determine a position and an orientation of the second object relative to at least one of the surface or the first object; comparing the image to the at least one other image to determine whether a combined position and orientation of the first object and the second object is a gesture or is a writing motion; and driving the display to output one or more display elements based, at least in part, on the combined position and orientation of the first object and the second object.

C. The system as paragraph B recites, wherein the first object comprises a hand of a user and the second object comprises a stylus held by the hand of the user.

D. The system as paragraph A recites, wherein the stored instructions, when executed by the one or more processors, cause the one or more processors to perform operations comprising: driving the display to output a radial menu based, at least in part, on to the gesture or the writing motion.

E. The system as paragraph A recites, wherein the stored instructions, when executed by the one or more processors, cause the one or more processors to perform operations comprising: controlling a level of zoom of at least a portion of the display based, at least in part, on the distance of at least the portion of the object above the surface.

F. The system as paragraph A recites, wherein the stored instructions, when executed by the one or more processors, cause the one or more processors to perform operations comprising: determining that the position and the orientation of the object is a writing motion if the distance of at least the portion of the object above the surface is zero.

G. The system as paragraph A recites, wherein the stored instructions, when executed by the one or more processors, cause the one or more processors to perform operations comprising: comparing the image to the at least one other image to determine an amount of translation or rotation of the surface.

H. The system as paragraph A recites, wherein the camera comprises a depth camera, wherein the image from the camera further includes depth data for the object, and wherein the one or more processors determine the position and the orientation of the object relative to the surface based, at least in part, on the depth data.

I. The system as paragraph A recites, wherein the stored instructions, when executed by the one or more processors, cause the one or more processors to perform operations comprising: driving the display to output a representation of the object superimposed with the one or more display elements.

J. The system as paragraph A recites, wherein the system comprises a handheld electronic display device.

K. The system as paragraph A recites, wherein the stored instructions, when executed by the one or more processors, cause the one or more processors to perform operations comprising: identifying a texture or a material of the object by comparing the representation of the object in the image to a database of textures or materials.

L. A device comprising: a display; a depth camera directed to a space in front of the display, wherein the space includes a surface; a processor to receive depth data captured by the depth camera, wherein the processor is configured to determine, from the depth data; a types of an object in the space including the surface; a distance of the object from the surface; and at least one of an orientation or shape of the object; and wherein the processor is further configured to determine a gesture or a writing motion performed by the object based, at least in part, on the type, distance, and orientation or shape of the object.

M. The device as paragraph L recites, wherein the processor is further configured to: compare the distance or the orientation of the object to a previously determined distance or orientation of the object to infer a direction of motion or a speed of the object; and determine a type of the gesture based, at least in part, on the direction of motion or a speed of the object.

N. The device as paragraph L recites, further comprising one or more microphones, and wherein the processor is further configured to: determine the gesture or the writing motion performed by the object based, at least in part, on audio signals from the one or more microphones.

O. The device as paragraph L recites, wherein the processor is further configured to: control a level of zoom of at least a portion of the display based, at least in part, on the distance of the object above the surface.

P. The device as paragraph L recites, wherein the processor is further configured to: display a representation of the object on the display, wherein the representation of the object is scaled based, at least in part, on the distances of the object above the surface.

Q. A method comprising: receiving three-dimensional (3D) image data of an object and of a surface from a camera; analyzing the 3D image data to determine a position and an orientation of the object relative to the surface; determining a distance of at least a portion of the object above the surface based, at least in part, on the position or the orientation; if the distance of at least the portion of the object above the surface is substantially zero, then: tracking at least the portion of the object on the surface to determine a pattern followed by the portion of the object on the surface; and outputting the pattern on a display; and if the distance of at least the portion of the object above the surface is above a threshold value, then: comparing the orientation of the object with a database of orientations and corresponding gestures to determine type of gesture performed by the object; and performing an operation corresponding to the type of gesture performed by the object.

R. The method as paragraph Q recites, wherein performing the operation comprises: controlling a menu on the display by the gesture performed by the object.

S. The method as paragraph Q recites, wherein performing the operation comprises: displaying a representation of the object superimposed with one or more display elements of the display.

T. The method as paragraph Q recites, further comprising: selecting a portion of the display to correspond to a reference portion of the surface; determining the position of the object relative to the reference portion of the surface; and outputting the object on a location of the display based, at least in part, on the position of the object relative to the reference portion.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z." unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A mobile device comprising:

a touchscreen display;

one or more processors coupled to the touchscreen display;

a camera configured to capture images of a region external to the touchscreen display; and a memory storing instructions that, when executed by the one or more processors, cause the one or more processors to perform operations comprising:

receiving an image from the camera, the image including a representation of a surface acting as a virtual touchscreen in the region and an object on or above the surface within the region;

analyzing the image to determine a three-dimensional (3D) orientation of the object relative to the surface including a distance from the surface;

producing a virtual touchscreen event describing an interaction of the object with the surface;

providing the virtual touchscreen event to a software application capable of supporting 3D touch interactions; and driving the touchscreen display to output display elements, a first display element of the display elements including a replication of the object in the image superimposed on a display of the virtual touchscreen and oriented based, at least in part, on the 3D orientation of the object, and a second display element of the display elements including a drawing zoomed based on the distance from the surface.

2. The mobile device of claim 1, wherein the operations further comprise:

comparing the image to at least one other image to determine whether a 3D location and the 3D orientation of the object corresponds to a gesture or a writing motion.

3. The mobile device of claim 1, wherein the operations further comprise:

identifying, by the images, that one or more fingers are in contact with the surface for a specified period of time; and responsive to the identifying, driving the display to output a radial menu superimposed on the object.

4. The mobile device of claim 3, wherein the radial menu is one of a plurality of radial menus and each of the plurality of radial menus is displayed responsive to identifying a different number of fingers are in contact with the surface for the specified period of time.

5. The mobile device of claim 4, wherein the radial menus indicate directions to move the object to select a corresponding function of the radial menu and the operations further comprise:

identifying, based on the images, the direction of the object and performing the function corresponding to the direction.

6. The mobile device of claim 2, wherein the object is a first hand or held by the first hand of a user and the image further includes a representation of a second object, wherein a combination of the 3D location and orientation of the object and a position and orientation of the second object indicates a function to be performed on the display elements on the display.

7. The mobile device of claim 6, wherein the object comprises a stylus held by the first hand of the user.

8. The mobile device of claim 2, wherein the operations further comprise:

determining that the 3D location and the 3D orientation of the object corresponds to a writing motion if a distance of at least a portion of the object above the surface is zero.

9. The mobile device of claim 1, further comprising the software application, wherein the software application executes to determine the touchscreen event is a touchdown event responsive to the distance of at least a portion of the object above the surface being zero.

10. A mobile device comprising:

a touchscreen display;

a depth camera directed to a space in front of the touchscreen display, the space including a surface acting as a virtual touchscreen;

a processor configured to receive depth data from the depth camera, the processor configured to:

determine a three-dimensional (3D) orientation of an object relative to the surface including a distance from the surface;

produce a virtual touchscreen event describing an interaction of the object with the surface;

provide the virtual touchscreen event to a software application capable of supporting 3D touch interactions; and drive the touchscreen display to output display elements, a first display element of the display elements including a replication of the object in an image of the space superimposed on a display of the virtual touchscreen and oriented based, at least in part, on the 3D orientation of the object, and a second display element of the display elements including a drawing zoomed based on the distance from the surface.

11. The mobile device of claim 10, wherein the processor is further configured to:

compare the image to at least one other image to determine whether a 3D location and the 3D orientation of the object corresponds to a gesture or a writing motion.

12. The mobile device of claim 10, wherein the processor is further configured to:

identify, by the images, that one or more fingers are in contact with the surface for a specified period of time; and responsive to the identifying, drive the display to output a radial menu superimposed on the object.

13. The mobile device of claim 12, wherein the radial menu is one of a plurality of radial menus and each of the plurality of radial menus is displayed responsive to identifying a different number of fingers are in contact with the surface for the specified period of time.

14. The mobile device of claim 13, wherein the radial menus indicate directions to move the object to select a corresponding function of the radial menu and the processor is further configured to:

identify, based on the images, the direction of the object and performing the function corresponding to the direction.

15. The mobile device of claim 11, wherein the object is a first hand or held by the first hand of a user and the image further includes a representation of a second object, wherein a combination of the 3D location and orientation of the object and a position and orientation of the second object indicates a function to be performed on the display elements on the display.

16. The mobile device of claim 15, wherein the object comprises a stylus held by the first hand of the user.

17. A method comprising:

receiving an image from a camera, the image including a representation of a surface acting as a virtual touchscreen in a region external to a display and an object on or above the surface within the region:

analyzing the image to determine a three-dimensional (3D) orientation of the object relative to the surface including a distance from the surface;

producing a virtual touchscreen event describing an interaction of the object with the surface;

providing the virtual touchscreen event to a software application capable of supporting 3D touch interactions; and driving the display to output display elements, a first display element of the display elements including a replication of the object in the image superimposed on a display of the virtual touchscreen and oriented based, at least in part, on the 3D orientation of the object, and a second display element of the display elements including a drawing zoomed based on the distance from the surface.

18. The method of claim 17, further comprising:

comparing the image to at least one other image to determine whether a 3D location and the 3D orientation of the object corresponds to a gesture or a writing motion.

19. The method of claim 18, further comprising:

determining that the 3D location and the 3D orientation of the object corresponds to a writing motion if a distance of at least a portion of the object above the surface is zero.

20. The method of claim 17, further comprising executing the software application to determine the virtual screen event is a touchdown event responsive to the distance of at least a portion of the object above the surface being zero.

* * * * *